(12) United States Patent
Sagara et al.

(10) Patent No.: US 6,743,149 B2
(45) Date of Patent: Jun. 1, 2004

(54) TOROIDAL CONTINUOUSLY VARIABLE TRANSMISSION

(75) Inventors: Eio Sagara, Kanagawa (JP); Hiroyuki Hirano, Kanagawa (JP); Mikoto Ooishi, Toyko (JP)

(73) Assignee: Nissan Motor Co., Ltd., Yokohama (JP)

( * ) Notice: Subject to any disclaimer, the term of this patent is extended or adjusted under 35 U.S.C. 154(b) by 10 days.

(21) Appl. No.: 09/891,363

(22) Filed: Jun. 27, 2001

(65) Prior Publication Data

US 2002/0006847 A1 Jan. 17, 2002

(30) Foreign Application Priority Data

Jul. 17, 2000 (JP) ........................................ 2000-215977

(51) Int. Cl.[7] .............................................. F16H 15/38
(52) U.S. Cl. .......................................... 476/42; 476/40
(58) Field of Search ................................ 476/40, 42, 46

(56) References Cited

U.S. PATENT DOCUMENTS 1,570,591 A * 1/1926 Mercer ........................ 474/115
4,934,206 A 6/1990 Nakano

FOREIGN PATENT DOCUMENTS

| JP | 6-34009 | | 2/1994 |
| JP | 8-35551 | * | 2/1996 |
| JP | 11-230291 | | 8/1999 |

* cited by examiner

Primary Examiner—William C. Joyce
(74) Attorney, Agent, or Firm—Foley & Lardner LLP

(57) ABSTRACT

A toroidal continuously variable transmission (CVT) is comprised of first and second pairs of power rollers whose gyration angles are synchronized by first, second and third wires. The first wire is wound in the shape of 8-figure to power-roller supporting members of the first pair of power rollers, and the second wire is wound in the shape of 8-figure to power-roller supporting members of the second pair of power rollers. The third wire is wound around the four power-roller supporting members and fixed to the diagonally-arranged two power-roller supporting members. A pair of guide walls are disposed between the power-roller supporting members of the first pair of power rollers and between the power-roller supporting members of the second pair of power rollers and bend the third wire extending between the first-pair power-roller supporting members and between the second-pair power-roller supporting members toward output discs.

10 Claims, 14 Drawing Sheets

TOROIDAL CONTINUOUSLY VARIABLE TRANSMISSION

BACKGROUND OF THE INVENTION

The present invention relates to a toroidal continuously variable transmission (toroidal CVT) for a vehicle, and more particularly to a structural arrangement of a toroidal CVT.

Japanese Patent Provisional Publication NO. 6-34009 discloses a toroidal CVT of a half toroidal type in which first and second wires are wound in the shape of 8-figure to two pairs of power-roller supporting members respectively and a third wire is wound around the four power-roller supporting members while being fixed to two diagonally arranged power-roller supporting members.

SUMMARY OF THE INVENTION

However, such a wire, particularly a third wire, in a toroidal CVT is simply wound to four power-roller supporting members (trunnions), and therefore the toroidal CVT employing such a wire arrangement has the following problems.

First, it is necessary to provide a cylindrical portion at an upper portion of each power-roller supporting member for the wire. This provision of the cylindrical portion elongates the power roller supporting member and therefore the size of the toroidal CVT becomes large.

Since it is necessary to set the length of the third wire with a sufficient margin, there is a tendency that a play of the third wire is caused between the diagonally arranged power-roller supporting members. This degrades a synchronized responsibility or an accuracy of the synchronicity during the synchronization of a gyration angle (tilting rotation angle) of the four power rollers.

It is therefore an object of the present invention to provide an improved toroidal CVT which is advantageous in the fixing strength of a third wire while suppressing a play of a third wire between the diagonally arranged power roller supporting members.

A toroidal continuously variable transmission (CVT) according to the present invention comprises first and second input discs coaxially connected to an input shaft; first and second output discs coaxially disposed between the first and second input discs; pressure means for applying a pressing force along an axial direction of the toroidal CVT to the pair of the input discs; first and second power rollers disposed between the first input disc and the first output disc; third and fourth power rollers disposed between the second input disc and the second output disc; first, second, third and fourth power-roller supporting members supporting the first and second pairs of power rollers, respectively; a first wire wound in a shape of 8-figure to the first and second power-roller supporting members; a second wire wound in a shape of 8-figure to the third and fourth power-roller supporting members; a third wire wound around the first, second, third and fourth power roller supporting members and fixed to the first and third power-roller supporting members diagonally arranged; and guide walls disposed between the first and second power-roller supporting members and between the third and fourth power-roller supporting members, respectively, the guide walls bending the third wire extended between the first and second power-roller supporting members and between the third and fourth power-roller supporting members toward the output discs.

DETAILED DESCRIPTION OF THE INVENTION

Figure 1:
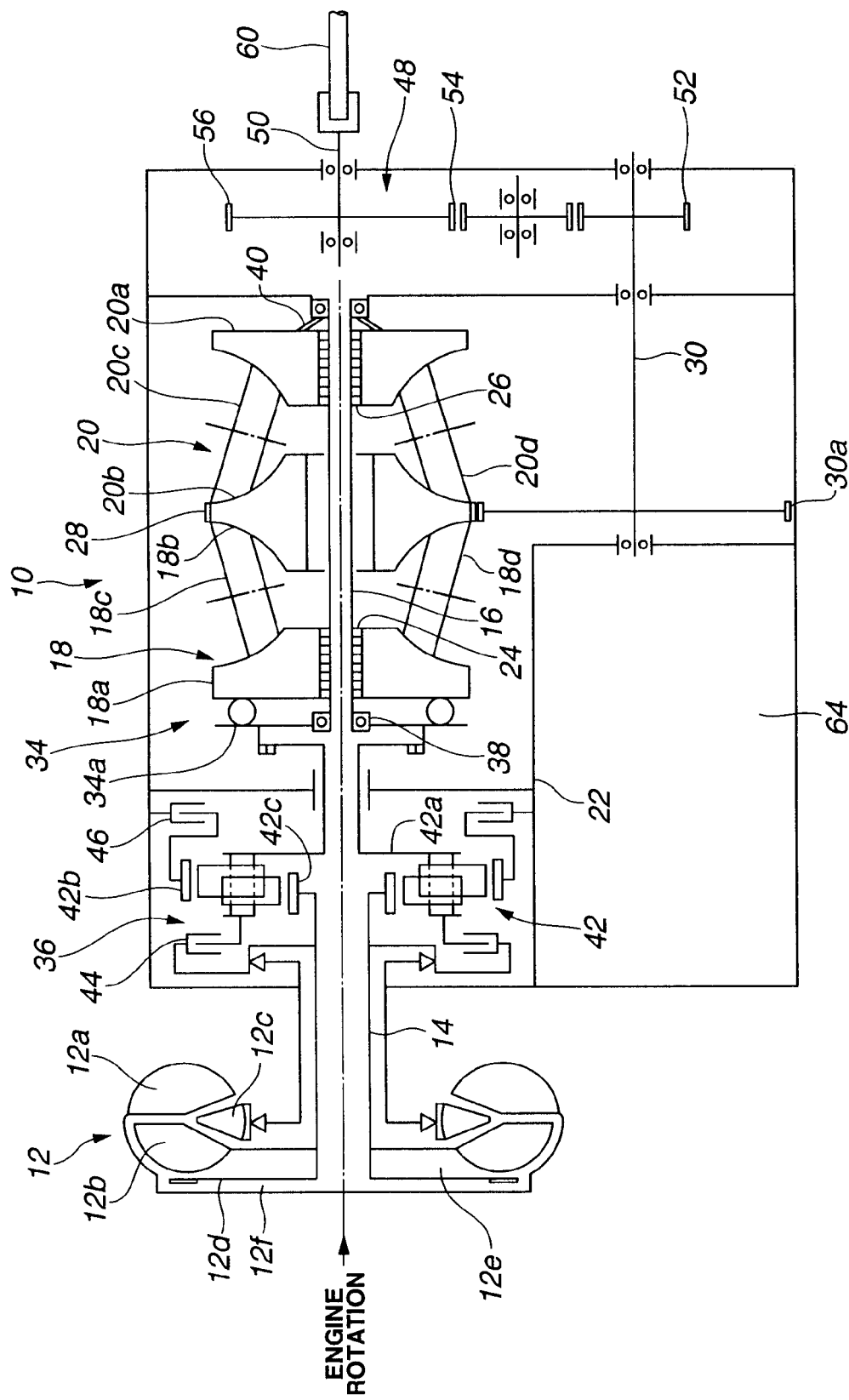
FIG. 1 is a schematic view showing a system of a toroidal continuously variable transmission (CVT) according to a first embodiment of the present invention.

Referring to FIGS. 1 to 4, there is shown a first embodiment of a toroidal continuously variable transmission (CVT) 10 according to the present invention. Toroidal CVT 10 is of a half-toroidal type which is superior to a full-toroidal type in view of spin loss. Toroidal CVT 10 receives a rotating driving force from an internal combustion engine (not shown) through a torque converter 12. Torque converter 12 comprises a pump impeller 12a, a turbine runner 12b, a stator 12c a lockup clutch 12d, apply oil chamber 12e and a release oil chamber 12f. An input shaft 14 penetrates a center portion of torque converter 12. Input shaft 14 is connected with a forward/reverse selecting mechanism 36. Forward/reverse selecting mechanism 36 comprises a planetary gear mechanism 42, a forward clutch 44, and a reverse clutch brake 46. Planetary gear mechanism 42 comprises a pinion carrier 42a for supporting double pinions, a ring gear 42b meshed with the double pinions, and a sun gear 42c.

Pinion carrier 42a of planetary gear mechanism 42 is connected with a torque transmission shaft 16 (corresponding to an input shaft. A first CVT mechanism 18 and a second CVT mechanism 29 are installed to torque transmission shaft 16 and disposed in a transmission case 22. These first and second CVT mechanisms 18 and 20 of toroidal CVT 10 are a so-called dual cavity type. A body 64 for a control valve system is disposed at a base portion of transmission case 22 which is located under forward/reverse selecting mechanism 36 and first CVT mechanism 18 as shown in FIG. 1.

First CVT mechanism 18 comprises a pair of input disc 18a and an output disc 18b whose opposite surfaces are formed into a toroidal curve surface, and a pair of power rollers 18c and 18d which are sandwiched by the opposite surfaces of input and output discs 18a and 18b. The pair of power rollers 18c and 18d are symmetrically arranged with respect to torque transmission shaft 16. Similarly, second CVT mechanism 20 comprises a pair of an input disc 20a and an output disc 20b whose opposite surfaces are formed into a toroidal curve surface, and a pair of power rollers 20c and 20d which are sandwiched by the opposite surfaces of input and output discs 20a and 20b. The pair of power rollers 20c and 20d are symmetrically arranged with respect to torque transmission shaft 16.

Input disc 18a of first CVT mechanism 18 is supported to torque transmission shaft 16 through a ball spline 24 so as to be movable along the axial direction of toroidal CVT 10, and is pushed by a loading cam mechanism 34 in the right hand side along the axial direction in FIG. 1. Loading cam mechanism 34 comprises a loading cam 34a which generates a pressing force increased according to an input torque inputted through torque converter 12. Input disc 20a of second CVT mechanism 20 is supported to torque transmission shaft 16 through a ball spline 26 so as to be movable along the axial direction, and is pushed by a dish spring 34 in the left hand side along the axial direction in FIG. 1 in accordance with the pressing force of loading cam 34a.

A back surface of output disc 18b of first CVT mechanisms 18 is integrally connected to a back surface of output disc 20b of second CVT mechanism 20. The pair of power rollers 18c and 18d of first CVT mechanism 18 and the pair of power rollers 20c and 20d of second CVT mechanism 20 are gyrated (tiltedly rotated), respectively, to ensure a gyration angle (tilting rotation angle) corresponding to a transmission ratio of toroidal CVT 10. According to the gyration angle, the input rotation of input discs 18a and 20a are continuously varied and transmitted to output discs 18b and 20b, respectively.

An output gear 28 is fixed to an outer periphery of output discs 18b and 20b. Therefore, the transmission torque is transmitted from output discs 18b and 20b to a gear 30a connected to a counter shaft 30 through output gear 20. Further, the transmission torque to gear 30a is outputted to a propeller shaft 60 through a transfer mechanism 48, which is constituted by a gear 52 provided on counter shaft 30, a gear 56 provided on an output shaft 50 and an idler gear meshed with gears 52 and 56.

[Structure of Shifting Mechanism]

Figure 2:
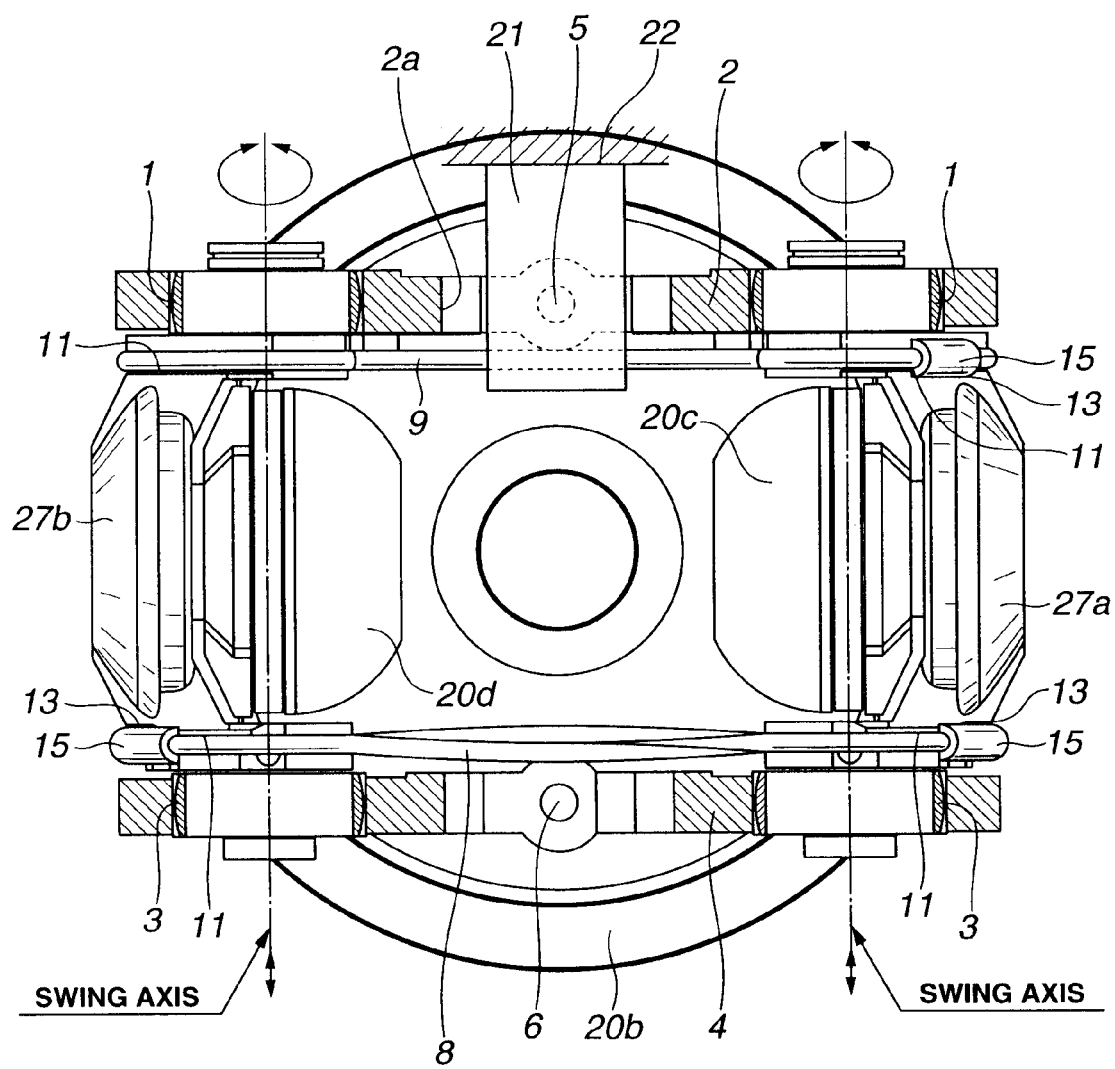
FIG. 2 is a cross-sectional view of the torodial CVT of the first embodiment taken in the direction of arrows substantially along the line II—II of FIG. 3.
Figure 3:
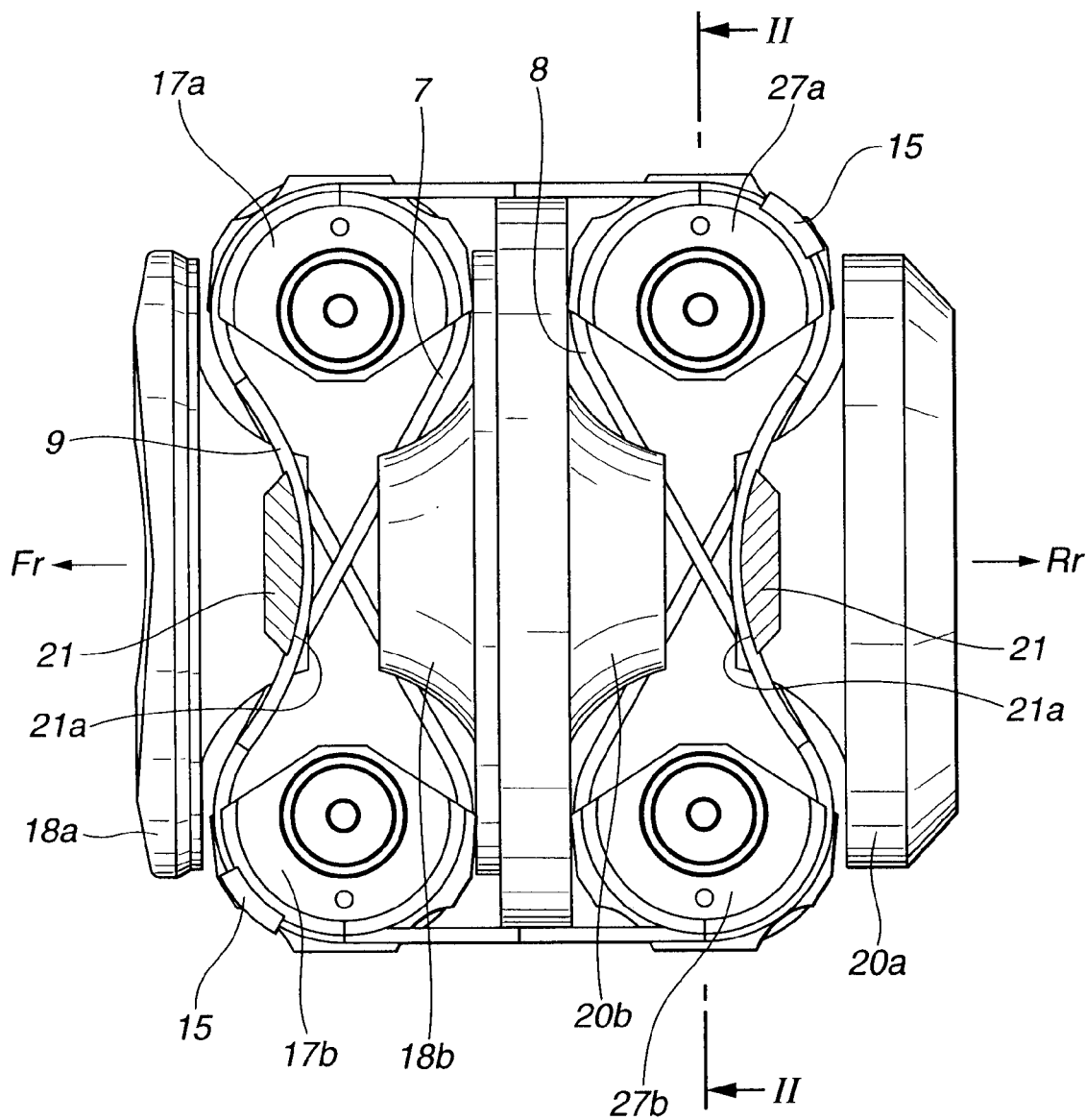
FIG. 3 is a plan view showing the toroidal CVT of the first embodiment.

With reference to FIGS. 2 and 3, a structure of first and second CVT mechanisms 18 and 20 will be discussed hereinafter.

Power rollers 18c, 18d, 20c and 20d are supported to trunnions 17a, 17b, 27a and 27b, respectively, so as to be rotatable and slidable in parallel along the right and left directions in FIG. 2, with respect to trunnions 17a, 17b, 27a and 27b, respectively. An upper end portion of each trunnion 17a, 17b, 27a, 27b is supported to an upper link 2 through a spherical bearing 1, and a lower end portion of each trunnion 17a, 17b, 27a, 27b is supported to a lower link 4 through a spherical bearing 3. These trunnions 17a, 17b, 27a and 27b function as power-roller supporting members. Upper link 2 and lower link 4 are supported in transmission case 22 so as to be swingable on swing shafts 5, 6, respectively.

During a shifting of toroidal CVT 10, when trunnions 17a, 17b, 27a and 27b are displaced in the respective swing axes by means of hydraulic actuator (not shown), displacement quantities and displacement directions of the respective trunnions 17a, 17b, 27a and 27b are synchronized by upper link 2 and lower link 4.

Further, in order to synchronize the gyration angles of power rollers 18c, 18d, 20c and 20d during shifting, lower end portions of the respective trunnions 17a, 17b, 27a and 27b are interconnected with each other by means of first and second wires 7 and 8, and upper end portions of the respective trunnions 17a, 17b, 27a and 27b are interconnected with each other by means of a third wire 9. More specifically, as shown in FIGS. 2 and 3, first wire 7 is wound to trunnions 17a and 17b in the shape of 8-figure and fixed to trunnions 17a and 17b. Second wire 8 is wound to trunnions 27a and 27b in the shape of 8-figure and fixed to trunnions 27a and 27b. Third wire 9 is wound around four trunnions 17a, 17b, 27a and 27b and is fixed to two trunnions 17b and 27a which are diagonally arranged.

Next, a wire fixing structure of third wire 9 to trunnions 17a, 17b, 27a and 27b will be discussed. Each of two trunnions 17b and 27a has a wire guide groove 11 and a wire fixing groove 13 communicated with wire guide groove 11. Two fixing hardwares 15 are attached to third wire 9 and are fixed to two wire fixing grooves 13, respectively, by means of caulking. Each of two trunnions 17a and 27b has only a wire guide groove 11.

Two guide walls 21 are provided at a first portion between trunnions 17a and 17b and a second portion between trunnions 27a and 27b, respectively. Guide walls 21 bend third wire 9 toward an inward direction (toward output discs 18b and 20b) where a wire winding angle to each of trunnions 17b and 27a is increased. In other words, each of guide walls 21 are located at a position which is closer to output discs 18b and 20b than a first straight line connecting outer peripheries of trunnions 17a and 17b and a second straight line connecting outer peripheries of trunnions 27a and 27b (i.e., the respective guide walls 21 are located on the output discs side relative to the first and second straight lines, respectively). Guide walls 21 are fixed to transmission case 22 and project from transmission case 22 through through-holes 2a formed at a center portion of upper link 2. As shown in FIG. 3, guide wall 21 has a contact surface 21a which is in contact with third wire 9. Contact surface 21a is formed into an arc-shaped surface which ensures a smooth contact with third wire 9.

Next, the manner of operation of toroidal CVT 10 will be discussed.

[Transmission Ratio Control]

Toroidal CVT 10 is arranged to generate sideslip forces at power rollers 18c and 18d of first CVT mechanism 18 contacting with input and output discs 18a and 18b through transmission oil and at power rollers 20c and 20d of second CVT mechanism 20 contacting with input and output discs 20a and 20b through transmission oil when a small displacement is applied to trunnions 17a, 17b, 27a and 27 in the swinging direction (vertical direction) through a not-shown servo piston for shifting. Due to this sideslip force, power rollers 18c, 18d, 20c and 20d are inclinedly gyrated, and therefore the transmission ratio, which is determined according to the gyration angle of power rollers 18c, 18d, 20c and 20d, is continuously varied. The gyration motion and the displacement are feedbacked through a not-shown cam mechanism, and when the transmission ratio reaches a desired transmission ratio corresponding to the shift command, the displacements of trunnions 17a, 17b, 27a and 27b are returned to the position where the power roller rotation axis corresponds to the input and output disc rotation axis to stay the transmission ratio at the desired transmission ratio.

[Gyration-Angle Synchronizing Operation by Wire]

In case of a torodidal CVT which comprises first and second transmission mechanisms 18 and 20 arranged in parallel, it is necessary to correspond the transmission ratios of the two transmission mechanisms 18 and 20 so as to prevent the output rotation speeds relative to the input rotation speed from becoming different. In this case, first transmission mechanism 18 comprises two power rollers 18c and 18d disposed between the pair of input and output discs 18a and 18b, and second transmission mechanism 20 comprises two power rollers 20c and 20d disposed between the pair of input and output discs 20a and 20b. In other words, it is necessary to synchronize the gyration angles of four power rollers 18c, 18d, 20c and 20d with respect to input and output discs 18a, 18b, 20a and 20b. Therefore, four trunnions 17a, 17b, 27a, 27b are interconnected by winding first wire 7, second wire 8 and third wire 9.

First wire 7 is wound in the shape of 8-figure to trunnions 17a and 17b provided at the right and left positions in the front side of toroidal CVT 10. Since first wire 7 is fixed to the respective trunnions 17a and 17b, first wire 7 functions to synchronize the gyration angles of power rollers 18c and 18d. Second wire 8 is wound in the shape of 8-figure to trunnions 27a and 27b provided at the right and left positions in the rear side of toroidal CVT 10. Since second wire 8 is fixed to the respective trunnions 27a and 27b, second wire 8 functions to synchronize the gyration angles of power rollers 20c and 20d. Further, third wire 9 is wound around four trunnions 17a, 17b, 27a and 27b and fixed to trunnions 17b and 27a which are diagonally arranged. Therefore, third wire 9 functions to synchronize the gyration angles of power rollers 18d and 20c. Consequently, by the provision of first, second and third wires 7, 8 and 9, the synchronization of the gyration angles of power rollers 18c, 18d, 20c and 20d is ensured.

Further, by providing guide walls 21 and 21 at the positions in the vicinity of third wire 9 extending along the right and left direction, third wire 9 extending in the right and left direction is bent toward output discs 18b and 20b. The bending of third wire 9 increases the winding angle to trunnions 17b and 27a to which third wire 9 is fixed. This arrangement enables a dimension (angle) of fixing member 15 to be large, and therefore the fixing strength of third wire 9 to trunnions 17b and 27a is increased.

Next, the advantages of the arrangement according to the present invention will be discussed.

Since toroidal CVT 10 according to the present invention is arranged such that third wire 9 is wound around trunnions 17a, 17b, 27a and 27b and guide walls 21 and 21 bend third wire 9 toward output discs 18b and 20b so as to increase the wire winding angle to trunnions 17b and 27a, it is not necessary to elongate an axial dimension of each trunnion 17a, 17b, 27a, 27b for providing a cylindrical portion to which third wire 9 is wound. This suppresses the size of toroidal CVT. Further, a play of third wire 9 is suppressed, particularly between the diagonal direction of trunnions 17b and 27a.

Further, since guide walls 21 and 21 are provided at positions in the vicinity of third wire 9 extending in right and left direction, third wire 9 is bent and therefore the wire winding angle of each trunnion 17b, 27a, which are diagonally arranged, is increased. Accordingly, the fixing strength of third wire 9 to trunnions 17b and 27a is increased.

Figure 4:
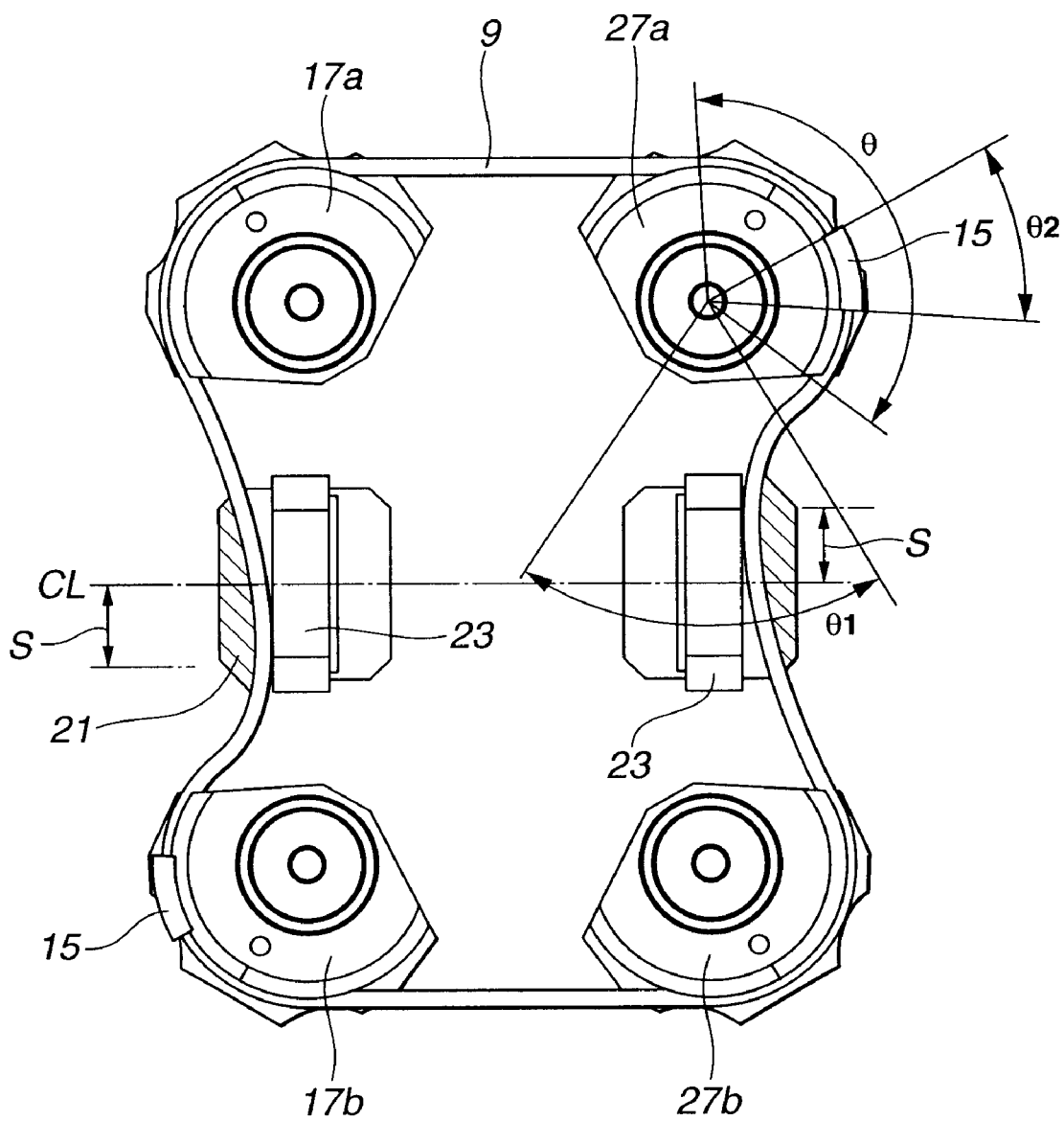
FIG. 4 is a plan view showing the toroidal CVT of a second embodiment according to the present invention.

Referring to FIG. 4, there is shown a second embodiment of toroidal CVT 10 according to the present invention. In contrast to the first embodiment arranged such that the maximum bent positions of third wire 9, which is bent by guide wall 21, are located at intermediate portions between trunnions 17a and 17b and between trunnions 27a and 27b, the second embodiment according to the present invention is arranged such that maximum bent positions of third wire 9 are located at positions which are offset from intermediate positions CL toward trunnion 17b and toward trunnion 27a, respectively by an offset quantity S, as shown in FIG. 4. Accordingly, the wire winding angle θ of third wire 9 to each of trunnions 17b and 27a is set to be greater than the sum of a swinging angle θ1 and a fixing member angle θ2 to trunnions 17b and 27a (θ>θ1 +θ2). In the second embodiment, intermediate walls 23 are further provided as shown in FIG. 4, and the other elements and structure of the second embodiment are the same as those of the first embodiment. Therefore, the explanation thereof are omitted herein.

Next, the advantages of the second embodiment according to the present invention will be discussed.

As described above, the maximum bent position of third wire 9 is located at the position, which is offset from the center-lined position CL toward each of trunnions 17b and 27a. The maximum bent position is produced by guide wall 21 which inwardly pushes third wire 9 extended in the right and left direction. Therefore, the wire winding angle θ of third wire 9 to each of trunnions 17b and 27a is greater than the winding angle θ ensured by the first embodiment. This arrangement of the second embodiment enables a second winding angle to each of trunnions 17a and 27b, to which third wire 9 is not fixed, to be decreased as compared with the winding angle θ ensured by the first embodiment. Accordingly, it becomes possible to increase the swing angle (gyration angle of power rollers 18c, 20d) of trunnions 17b and 27a fixed to third wire 9. That is to say, it becomes possible to elongate a variable range of the transmission ratio of toroidal CVT 10.

Further, since the second winding angle to the remaining trunnions 17a and 27b is set to be smaller than the swinging angle θ of trunnions 17b and 27a, friction due to a relative slip is decreased, and therefore, this arrangement prevents the synchronicity (cooperativity) of trunnions 17a, 17b, 27a and 27b from being degraded. Since the wire winding angle θ to trunnions 17b and 27a fixed to third wire 9 is set to be grater than the sum of the swinging angle θ1 and the fixing member angle θ2 of trunnions 17b and 27a (θ>θ1+θ2), third wire 9 is firmly wound on trunnions 17a, 17b, 27a and 27b even if trunnions 17a, 17b, 27a and 27b are swung to produce a limit of the transmission ratio. This improves the stability of the shifting operation of toroidal CVT 10.

Figure 5:
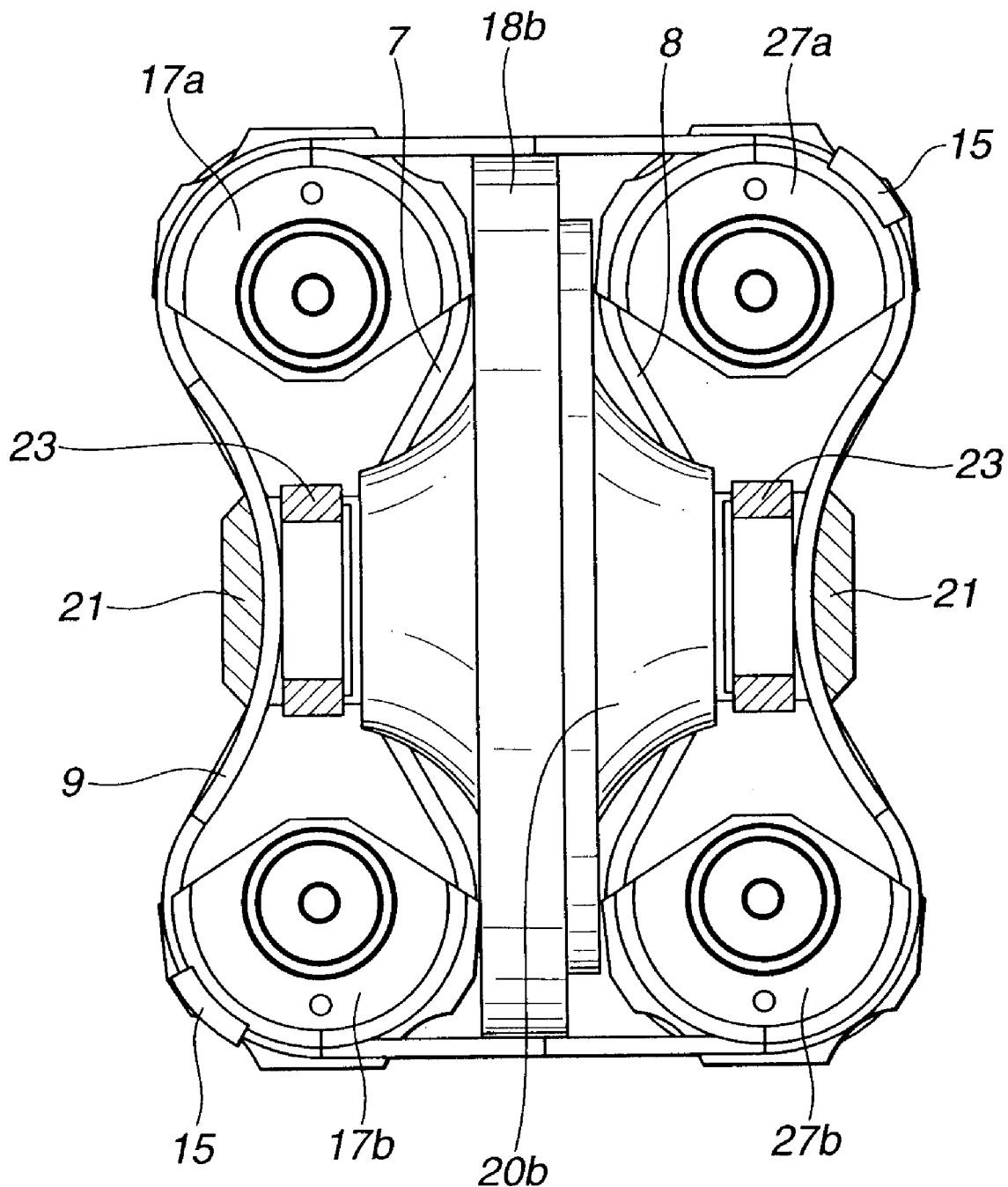
FIG. 5 is a plan view showing the toroidal CVT of a third embodiment according to the present invention.
Figure 6:
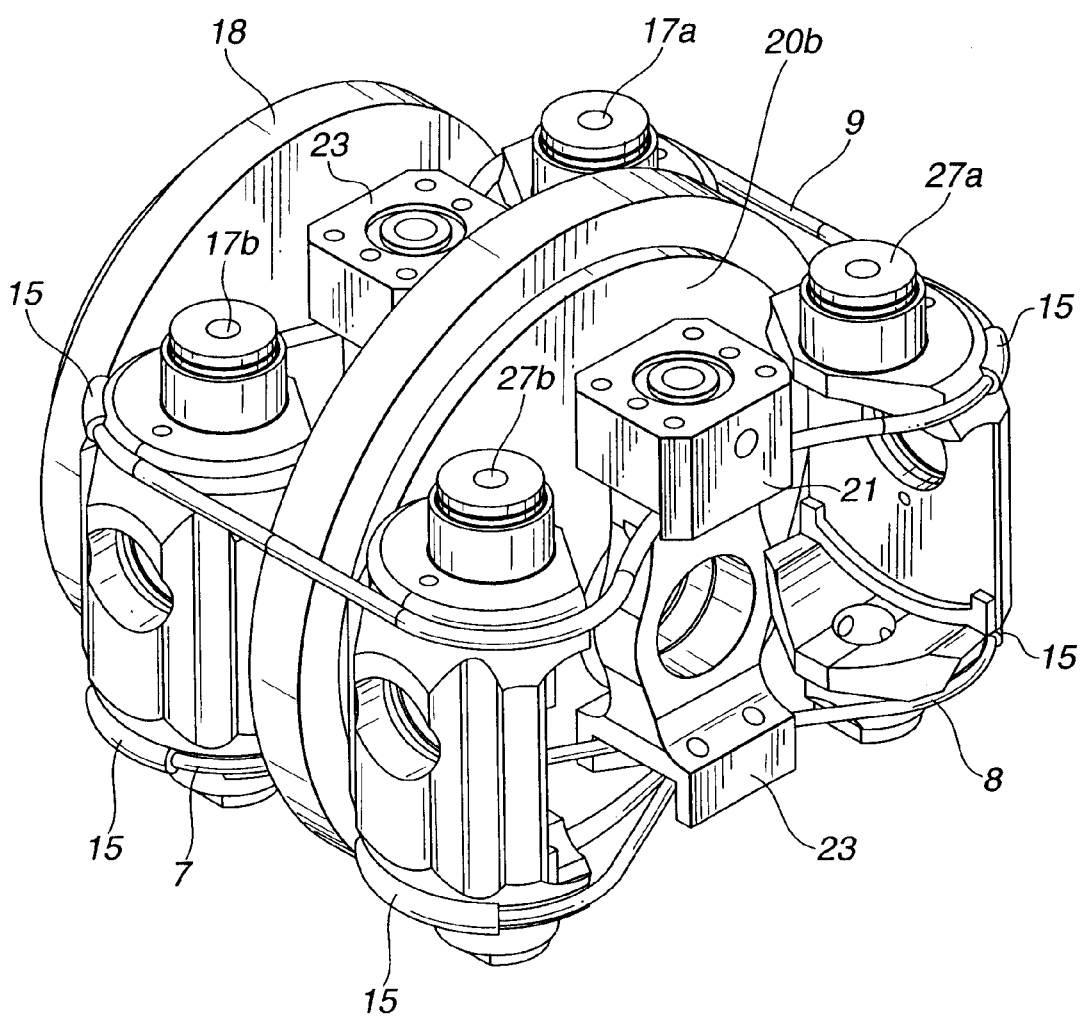
FIG. 6 is a perspective view showing the toroidal CVT of the third embodiment.

Referring to FIGS. 5 and 6, there is shown a third embodiment of toroidal CVT according to the present invention. The third embodiment is arranged such that guide walls 21 and 21 are integrally formed with a pair of intermediate walls 23 and 23, as shown in FIGS. 5 and 6. More specifically, in contrast to the arrangement of the first and second embodiments where guide walls 21 are installed to transmission case 22, guide walls 21 of the third embodiment are disposed at the front and rear sides of output discs 18b and 20b and are integrally formed with a pair of intermediate walls 23 (positioning means), respectively. Intermediate walls 23 function to limit an axial direction displacement of output discs 18b and 20b. Further, as is similar to the first and second embodiments, first wire 7 and second wire 8 are disposed in the vicinity of upper link 2 for trunnions 17a, 17b, 27a and 27b, and third wire 9 is disposed in the vicinity of lower link 4 for trunnions 17a, 17b, 27a and 27b. Third wire 9 is separated from first and second wires 7 and 8 such that first and second wires 7 and 8 are installed to one end portions of the respective trunnions 17a, 17b, 27a and 27b and third wire 9 is installed to the other end portions of the respective trunnions 17a, 17b, 27a and 27b. The other arrangement and elements of the third embodiment are the same as those of the first embodiment, and therefore the explanation thereof is omitted herein.

The functional advantages of the third embodiment will be discussed hereinafter.

Since guide walls 21 and 21 are integrally formed with the pair of intermediate walls 23 and 23, guide walls 21 and 21 are easily fixed by fixing intermediate walls 23 and 23. Further, it becomes possible to previously assemble third wire 9 with output discs 18b and 20b and intermediate walls 23, 23 separately from the main assembly. This largely improves the assembling operations of toroidal CVT 10. That is to say, the third embodiment enables guide walls 21 and 21 to ensure the strength to decrease the number of parts and to improve the assembling operations. Consequently, these arrangements of the third embodiment simplify the structure of toroidal CVT and decrease the size of toroidal CVT. Furthermore, third wire 9 is separately arranged from first and second wires 7 and 8 such that first and second wires 7 and 8 are installed to end portions of the respective trunnions 17a, 17b, 27a and 27b and third wire 9 is installed to the other end portions of the respective trunnions 17a, 17b, 27a and 27b. Therefore, it becomes possible to set distances from the respective centers of power rollers of trunnions 17a, 17b, 27a and 27b to first and second wires 7 and 8 and a distance to third wire 9 so as to be generally symmetric. This arrangement contributes to shorten an overall length of trunnions 17a, 17b, 27a and 27b.

Figure 7:
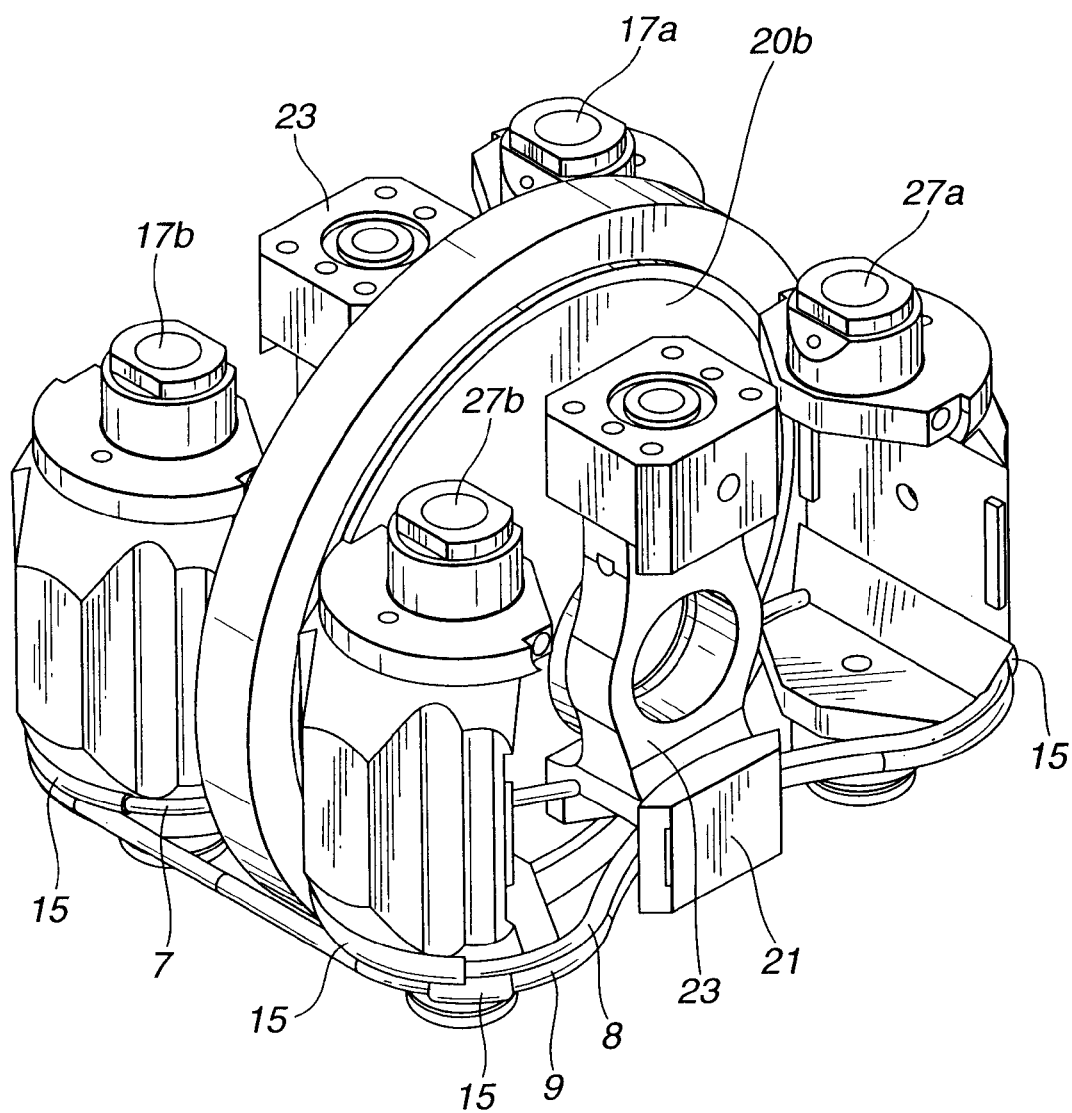
FIG. 7 is a perspective view showing a modification of the toroidal CVT of the third embodiment.
Figure 8:
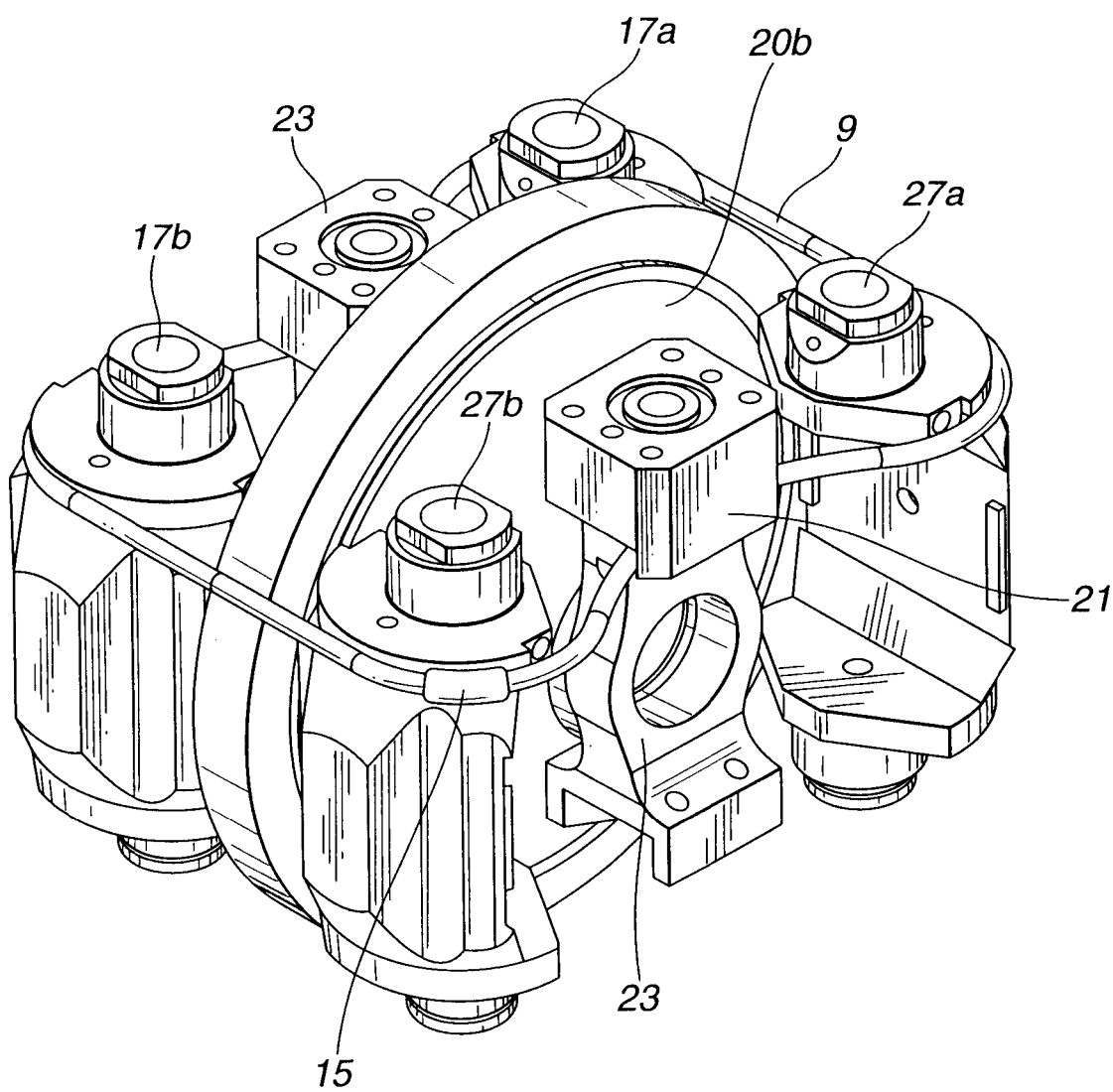
FIG. 8 is a perspective view showing another modification of the toroidal CVT of the third embodiment.

Further, third wire 9 may be arranged in the vicinity of lower link 4 of trunnions 17a, 17b, 27a and 27b as shown in FIG. 7. Further, third wire 9 may be arranged in the vicinity of upper link 2 of trunnions 17a, 17b, 27a and 27b as shown in FIG. 8. Furthermore, all of first and second wires 7 and 8 and third wire 9 may be disposed in the vicinity of lower link 4 of trunnions 17a, 17b, 27a and 27b as shown in FIG. 7.

Figure 9:
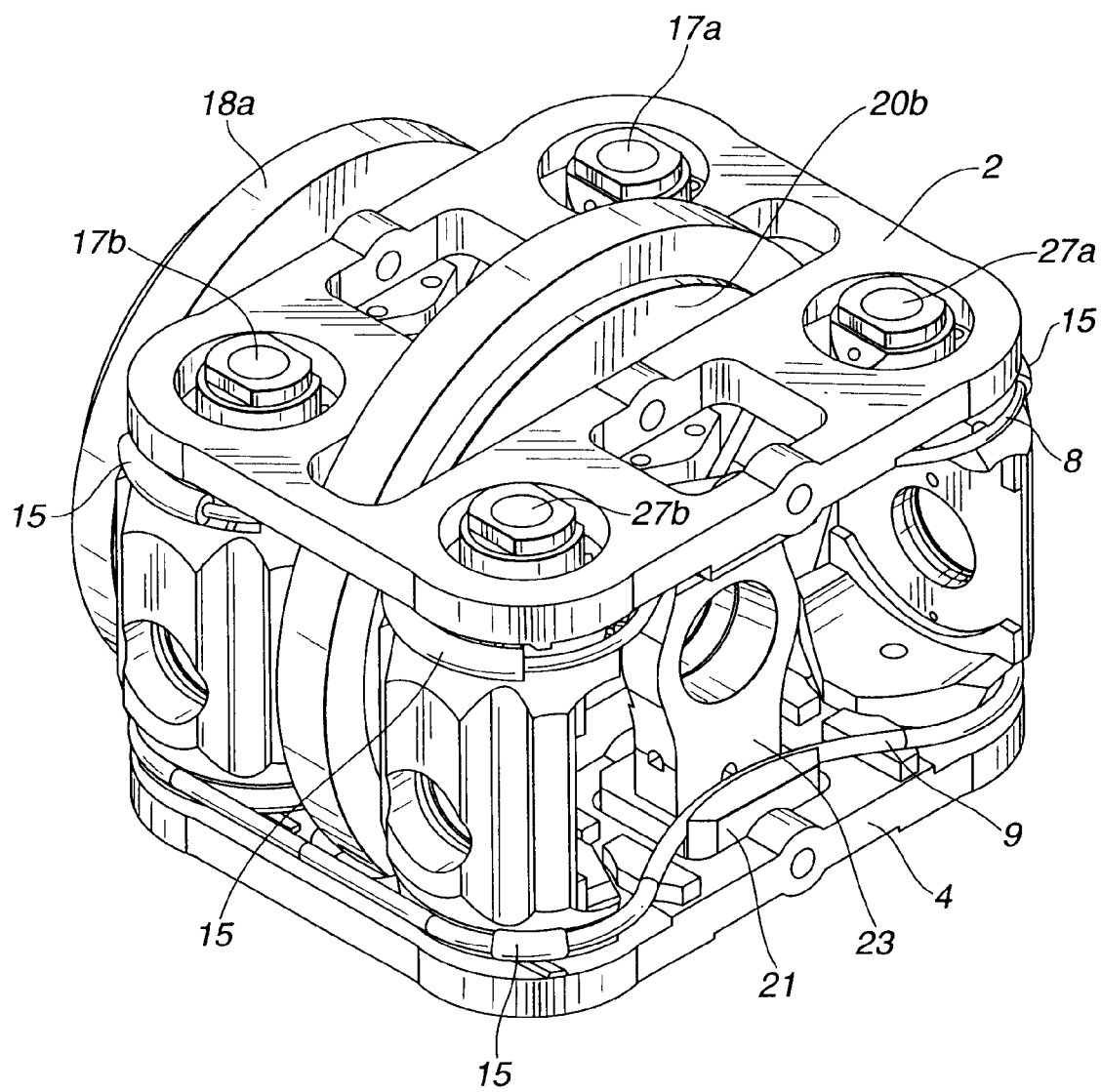
FIG. 9 is a perspective view showing the toroidal CVT of a fourth embodiment according to the present invention.
Figure 10:
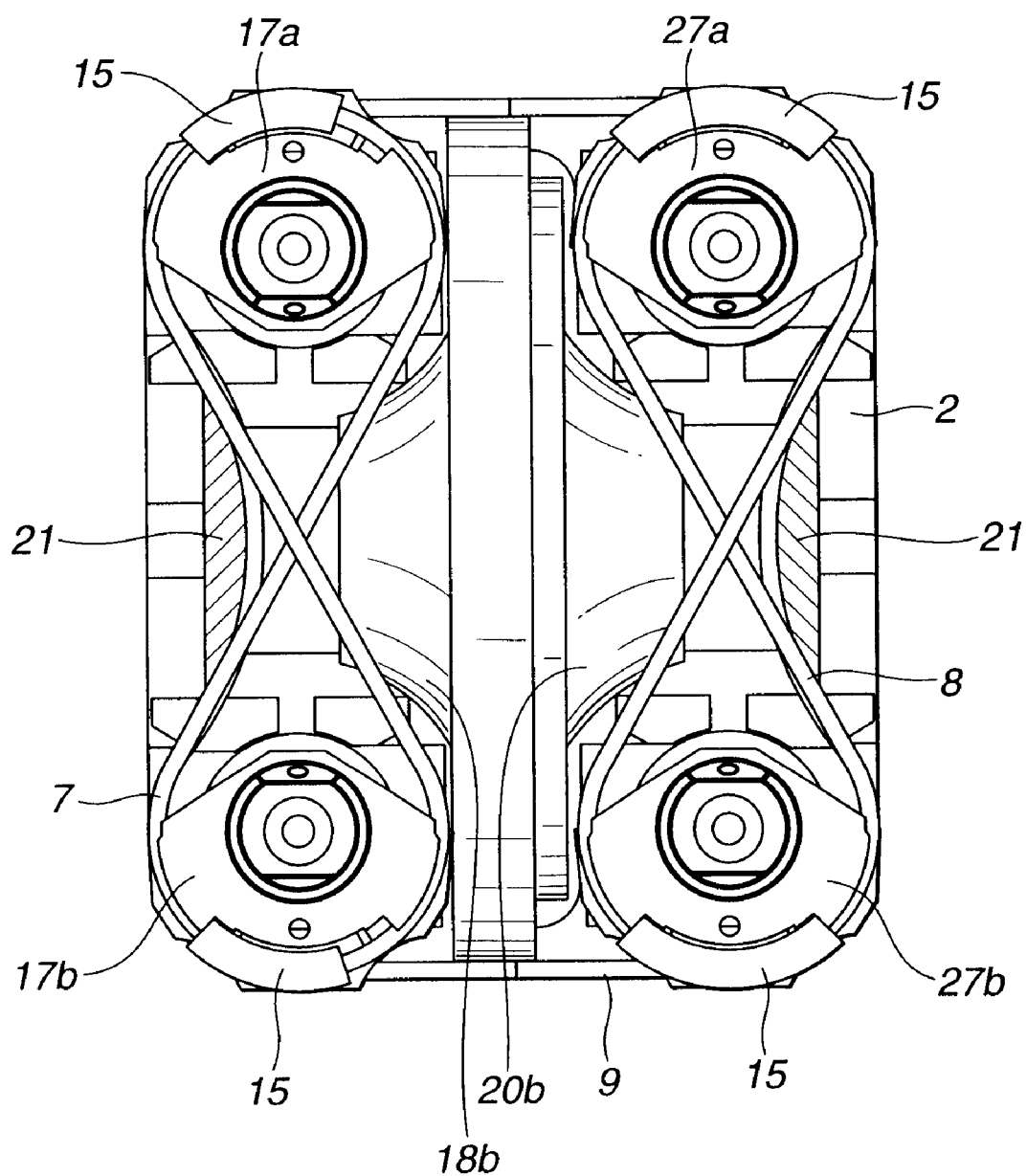
FIG. 10 is a plan view showing the toroidal CVT of the fourth embodiment.

Referring to FIGS. 9 and 10, there is shown a fourth embodiment of toroidal CVT 10 according to the present invention.

The fourth embodiment is arranged such that third wire 9 is disposed in the vicinity of lower link 9 as shown in FIGS. 9 and 10 and guide walls 21 and 21 are integrally formed with lower link 9, in contrast to the arrangement of third wire 9 in the vicinity of upper link 2 as described in the first, second and third embodiments. The other arrangement and elements of the fourth embodiment are the same as those of the first embodiment, and therefore the explanation thereof is omitted herein.

The functional advantages of the fourth embodiment will be discussed hereinafter. The fourth embodiment is arranged such that third wire 9 is separately disposed from first and second wires 7 and 8 into upper and lower positions. More specifically, first and second wires 7 and 8 are installed in the vicinity of upper link 3 and third wire 9 is installed in the vicinity of lower link 4. Therefore, it becomes possible to shorten the axial length of each of trunnions 17a, 17b, 27a and 27b. This arrangement enables toroidal CVT 10 to be simple and compact. Further, since third wire 9 is disposed in the vicinity of lower link 4, it becomes possible to execute an assembling operation of third wire 9 during a final step of the assembling process by assembling third wire 9 from the side of an oil pan. That is to say, by providing third wire 9 at a side of lower link 4, it becomes possible to wind third wire 9 to trunnions 17a, 17b, 27a and 27b assembled at a time. This largely improves the winding assembly operation of third wire 9.

Further, since guide walls 21 and 21 are integrally formed with lower link 4, it becomes possible to ensure the strength of guide walls 21 and 21, to decrease the number of parts and to improve the assembling operations. Consequently, these arrangements of the fourth embodiment simplify the structure of toroidal CVT 10 and decrease the size of toroidal CVT 10 and improve the assembling operation. More specifically, it becomes possible to execute a tension control of third wire 9 by adjusting guide walls 21 and 21 after assembling the shaft members of toroidal CVT 10 and during the assembling operation of lower link 4. This largely improves the assembling operation of toroidal CVT 10.

Figure 11:
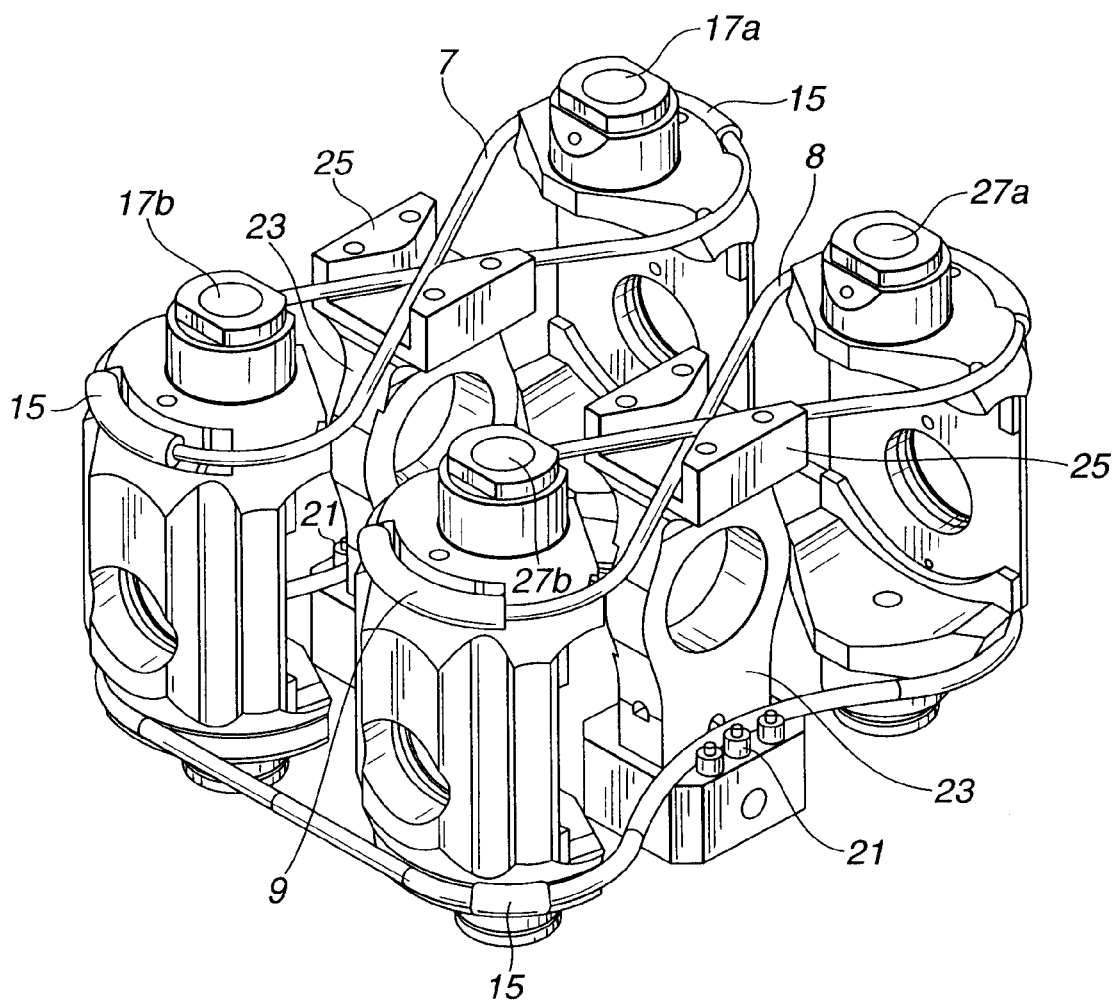
FIG. 11 is a perspective view showing the toroidal CVT of a fifth embodiment according to the present invention.
Figure 12:
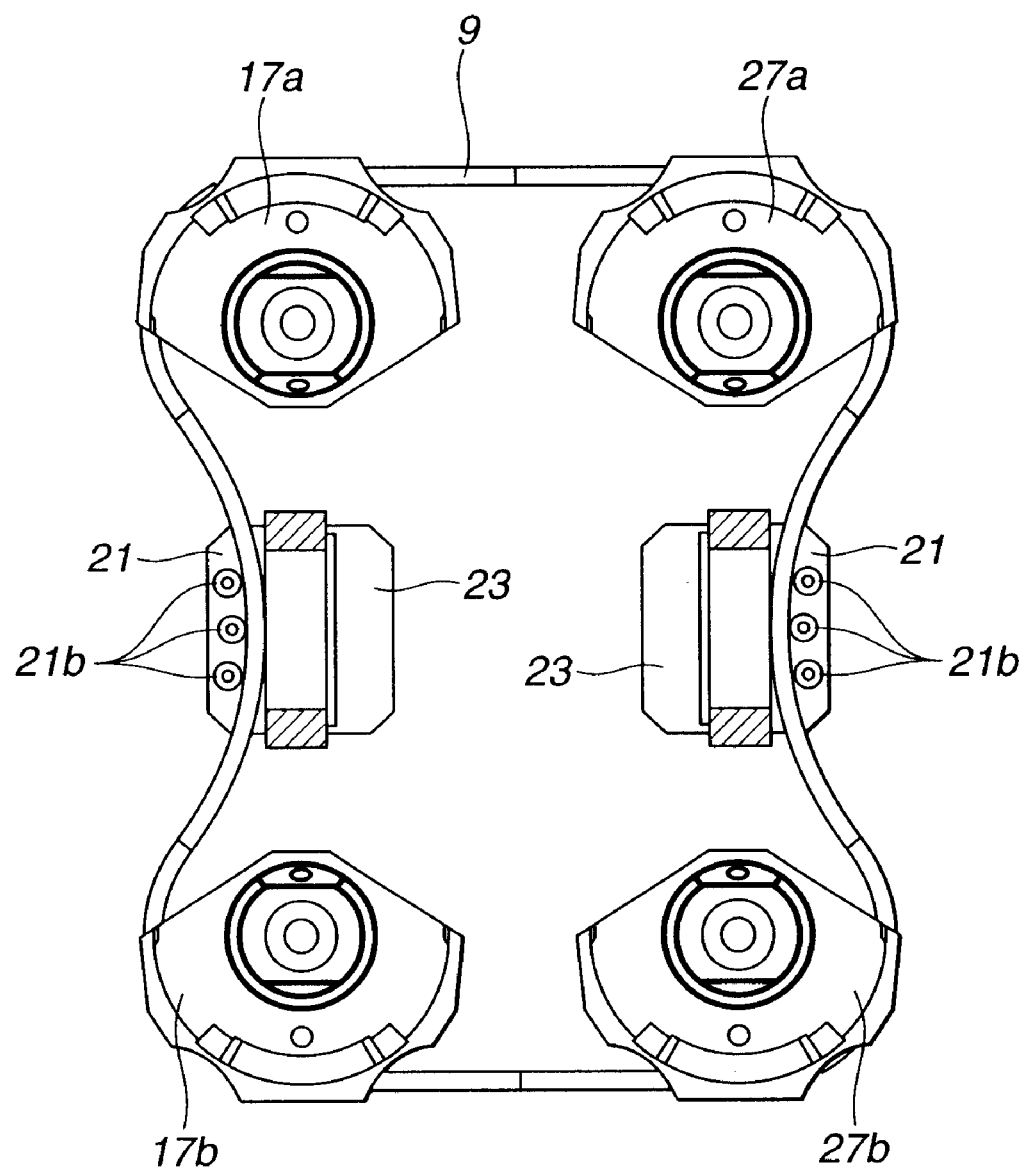
FIG. 12 is a plan view showing the toroidal CVT of the firth embodiment.

Referring to FIGS. 11 and 12, there is shown a fifth embodiment of toroidal CVT 10 according to the present invention. In contrast to the first to fourth embodiments which are arranged such that each of guide walls 21 and 21 for third wire 9 is configured to having an arc shaped surface, the fifth embodiment according to the present invention is arranged such that guide walls 21 and 21 are constituted by a plurality of guide rollers (radial bearings) 21b as shown in FIGS. 11 and 12. Guide walls 21 and 21 function to bend third wire 9 extending in the right and left direction to the inward direction. Guide walls 21 and 21 are integrally formed with intermediate walls 23 and 23. Further, guide walls 25 and 25 for guiding first and second wires 7 and 8 are integrally formed with intermediate walls 23 and 23, respectively. The other elements of the fifth embodiment are the same as those of the first embodiment and are denoted by the same reference numerals, respectively. Therefore, the explanation thereof are omitted herein.

The advantages gained by the fifth embodiment will be discussed hereinafter.

Since the fifth embodiment according to the present invention is arranged such that guide walls 21 and 21 for bending third wire 9 are constituted by guide rollers, the contact between guide walls 21 and 21 and third wire 9 is a rolling contact and therefore the friction caused by this contact is largely decreased. Consequently, it becomes possible to ensure an effect for preventing the synchronicity of trunnions 17a, 17b, 27a and 27b from being degraded and to suppress the wearing of third wire 9, and therefore the durability of toroidal CVT is improved.

Figure 13:
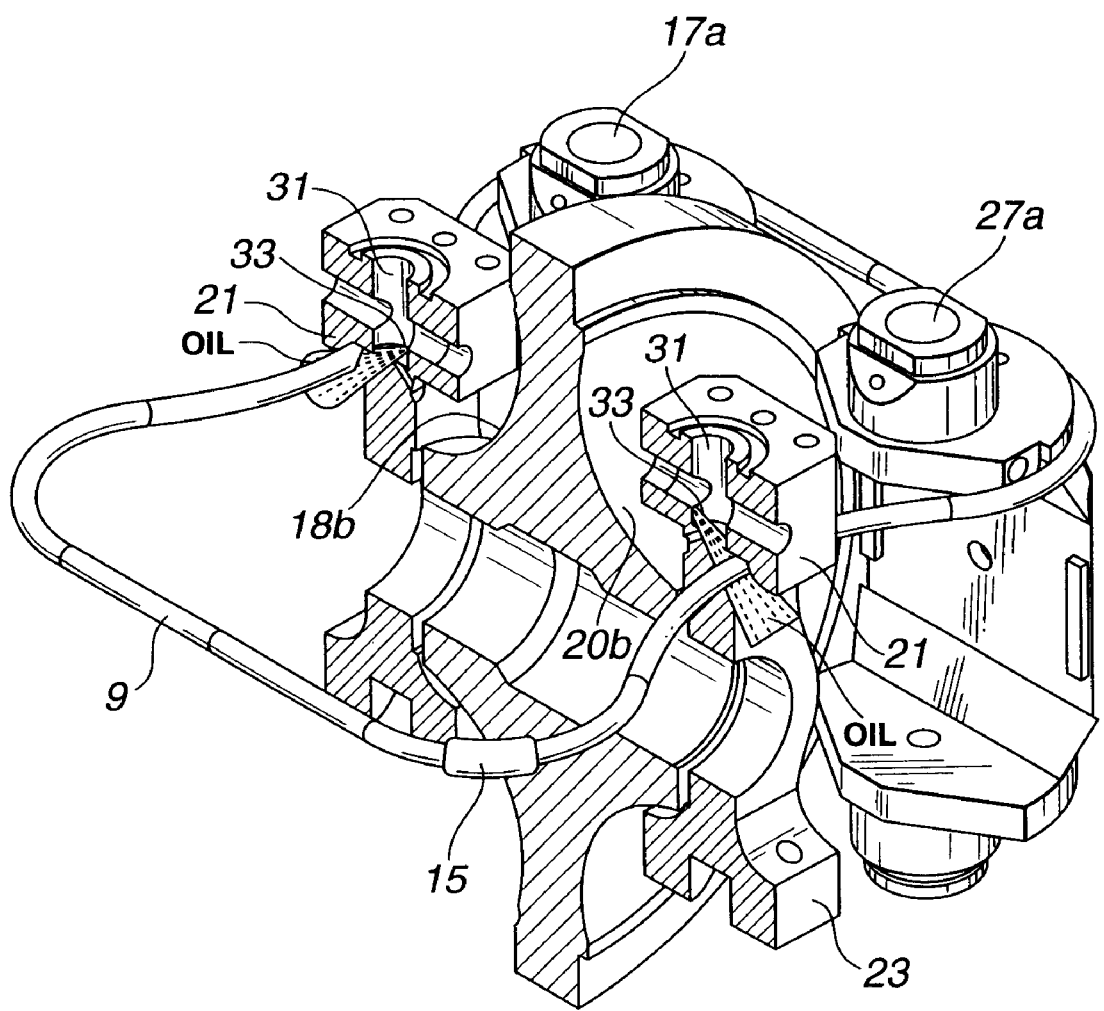
FIG. 13 is a partially cutout perspective view showing a sixth embodiment according to the present invention.
Figure 14:
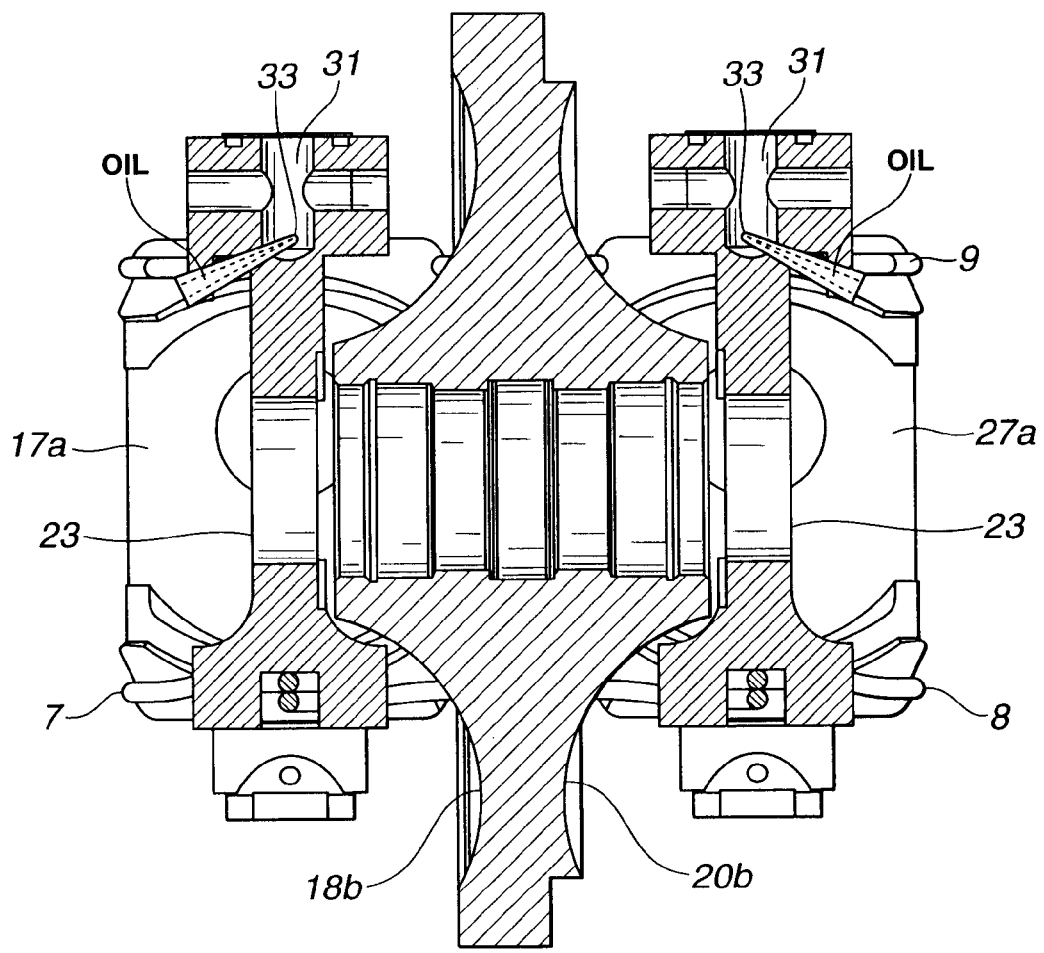
FIG. 14 is a vertical cross section view of the toroidal CVT of the sixth embodiment.

Referring to FIGS. 13 and 14, there is shown a sixth embodiment of toroidal CVT 10 according to the present invention. The sixth embodiment is characteristically arranged such that a lubrication passage 31 for supplying lubrication oil and a splashing port 33 (lubrication mechanism) are provided to each of intermediate walls 23 and 23, as shown in FIGS. 13 and 14. Further, guide walls 21 and 21 are integrally formed with intermediate walls 23 and 23. The other elements of the fifth embodiment are the same as those of the first embodiment and are denoted by the same reference numerals, respective. Therefore, the explanation thereof is omitted herein.

The advantages gained by the sixth embodiment according to the present invention will be discussed hereinafter.

Since the sixth embodiment is arranged such that lubrication oil is supplied to contact portions between third wire 9 and guide walls 21 and 21, the sliding operation between third wire 9 and guide walls 21 and 21 are smoothened, and third wire 9 and guide walls 21 and 21 are cooled by lubrication oil. Accordingly, this arrangement prevents seizing and wearing between the third wire 9 and guide walls 21 and 21.

Although the invention has been shown and described by the first to sixth embodiments described above, the invention is not limited to these embodiments and may include various modifications and variations which employ the structure such that the first and second wires 7 and 8 are installed to the pairs of power roller supporting members 17a, 17b, 27a and 27b in the shape of 8-figure and the third wire 9 is installed to outer peripheries of the four power roller supporting members 17a, 17b, 27a and 27b while being fixed with the diagonal two power roller supporting members 17b and 27a and a pair of guide walls are provided so as to bent the third wire 9 in the direction that the wire winding angle to the diagonally arranged two power roller supporting members 17b and 27a is increased.

The entire contents of Japanese Patent Application No. 2000-215977 filed on Jul. 17, 2000 in Japan are incorporated herein by reference.

Although the invention has been described above by reference to certain embodiments of the invention, the invention is not limited to the embodiments described above. Modifications and variations of the embodiment described above will occur to those skilled in the art, in light of the above teaching. The scope of the invention is defined with reference to the following claims.

What is claimed is:

1. A toroidal continuously variable transmission (CVT) comprising:
    first and second input discs coaxially connected to an input shaft;
    first and second output discs coaxially disposed between the first and second input discs;
    pressure means for applying a pressing force along an axial direction of the toroidal CVT to the pair of the input discs;
    first and second power rollers disposed between the first input disc and the first output disc;
    third and fourth power rollers disposed between the second input disc and the second output disc;
    first, second, third and fourth power-roller supporting members supporting the first, second, third and fourth power rollers, respectively;
    a first wire wound in a shape of 8-figure to the first and second power-roller supporting members;
    a second wire wound in a shape of 8-figure to the third and fourth power-roller supporting members;
    a third wire wound around the first, second, third and fourth power roller supporting members and fixed attached to the second and third power-roller supporting members diagonally arranged; and
    guide walls disposed between the first and second power-roller supporting members and between the third and fourth power-roller supporting members, respectively, the guide walls bending the third wire extended between the first and second power-roller supporting members and between the third and fourth power-roller supporting members toward the output discs.

2. A toroidal CVT as claimed in claim 1, wherein each of the guide walls is offset from a center position between the power roller supporting members toward a direction in that a first winding angle of the third wire to the diagonally arranged second and third power roller supporting members, to which the third wire is fixed, is increased and a second winding angle of the third wire to the other diagonally arranged first and fourth power roller supporting members, to which the third wire is supported, is decreased, as compared with the angles in case that the guide walls are disposed at the center position.

3. A toroidal CVT as claimed in claim 1, wherein a winding angle of the third wire to each of the second and third power roller supporting members is set to be greater than the sum of a swing angle of the power roller supporting members and a fixing member angle occupied by a fixing member.

4. A toroidal CVT as claimed in claim 1, wherein each of the guide walls is integral with each of a pair of positioning means for limiting an axial displacement of the output discs, the positioning means being arranged between front and rear sides of the output discs along the axial direction.

5. A toroidal CVT as claimed in claim 1, wherein the first and second wires are installed to first end portions of the power roller supporting members and the third wire is installed to second end portions of the power roller supporting members.

6. A toroidal CVT as claimed in claim 5, wherein the first wire is wound in a shape of 8 figure to the first ends portions of the first and second power roller supporting members corresponding in the vicinity of an upper link, and the second wire is wound in a shape of 8 figure to the first end portions of the third and fourth power roller supporting members in the vicinity of the upper link, and third wire is wound around the first, second, third and fourth power roller supporting members and fixed to the diagonally arranged second and third power roller supporting members in the vicinity of a lower link.

7. A toroidal CVT as claimed in claim 1, wherein each of the guide walls is integral with one of an upper link and a lower link.

8. A toroidal CVT as claimed in claim 1, further comprising a lubrication mechanism for supplying lubrication oil to a contacting portion between the third wire and the guide walls.

9. A toroidal CVT as claimed in claim 1, wherein the respective guide walls are located on the output discs side relative to a first straight line connecting outer peripheries of the first and second power-roller supporting members and a second straight line connecting outer peripheries of the third and fourth power-roller supporting members, respectively.

10. A toroidal continuously variable transmission (CVT) comprising:
    first and second input discs coaxially connected to an input shaft;
    first and second output discs coaxially disposed between the first and second input discs;
    first pair of power rollers disposed between the first input disc and the first output disc;
    second pair of power rollers disposed between the second input disc and the second output disc;
    first, second, third and fourth power-roller supporting members supporting the first and second pairs of power rollers, respectively;
    a wire wound around the first, second, third and fourth power roller supporting members and attached to the second and third power-roller supporting members diagonally arranged; and
    a guide wall disposed at least between the first and second power-roller supporting members and between the third and fourth power-roller supporting members, the guide wall bending the wire toward the output discs.

* * * * *

UNITED STATES PATENT AND TRADEMARK OFFICE
CERTIFICATE OF CORRECTION

PATENT NO. : 6,743,149 B2  Page 1 of 1
DATED : June 1, 2004
INVENTOR(S) : Eio Sagara, Hiroyuki Hirano and Mikoto Ohishi It is certified that error appears in the above-identified patent and that said Letters Patent is hereby corrected as shown below:

<u>Title page,</u>
Item [75], Inventors, the 3$^{rd}$ inventor's name should read as: -- Mikoto Ohishi --

Signed and Sealed this

Tenth Day of August, 2004

JON W. DUDAS
*Acting Director of the United States Patent and Trademark Office*